United States Patent
Guo et al.

(10) Patent No.: US 9,268,432 B2
(45) Date of Patent: Feb. 23, 2016

(54) TOUCH PANEL HAVING A MASTER AND SLAVE CONTROLLER AND METHOD FOR DRIVING THEREOF

(71) Applicant: STMicroelectronics Asia Pacific PTE LTD., Singapore (SG)

(72) Inventors: Dianbo Guo, Singapore (SG); KienBeng Tan, Singapore (SG)

(73) Assignee: STMICROELECTRONICS ASIA PACIFIC PTE LTD., Singapore (SG)

( * ) Notice: Subject to any disclaimer, the term of this patent is extended or adjusted under 35 U.S.C. 154(b) by 118 days.

(21) Appl. No.: 13/656,302

(22) Filed: Oct. 19, 2012

(65) Prior Publication Data

US 2014/0111443 A1  Apr. 24, 2014

(51) Int. Cl.
G06F 3/041 (2006.01)

(52) U.S. Cl.
CPC .................................. G06F 3/0416 (2013.01)

(58) Field of Classification Search
CPC ...................... G06F 3/044; G06F 2203/04107
USPC ....................................................... 345/173
See application file for complete search history.

(56) References Cited

U.S. PATENT DOCUMENTS

| 8,243,027 | B2 | 8/2012 | Hotelling et al. | |
|---|---|---|---|---|
| 2011/0304570 | A1* | 12/2011 | Maeda et al. | 345/173 |
| 2012/0056822 | A1* | 3/2012 | Wilson et al. | 345/173 |
| 2013/0038570 | A1* | 2/2013 | Seo et al. | 345/174 |
| 2013/0057507 | A1* | 3/2013 | Shin et al. | 345/174 |

OTHER PUBLICATIONS

Mackey, Bob, "Innovations in Touch Sensing, SID 2012-Session M-3," Synaptics, SID Boston, Jun. 2012, 85 pages.
"Multi-Touch Capacitive Touchscreen Controller," S-Touch® FingerTip, STMT05, Doc ID 18117, Rev. 2, www.st.com, pp. 1-16, Feb. 2011.
"5-Inch Multi-Touch Capacitive Touchscreen Controller," S-Touch® FingerTip, STMT05E, Doc ID 022155, www.st.com, Rev. 1, 4 pages, Aug. 2011.
"Multi-Touch Capacitive Touchscreen Controller," S-Touch® FingerTip, STMT05, Doc ID 18117, Rev. 1, www.st.com, 14 pages, Oct. 2010.

* cited by examiner

*Primary Examiner* — Long D Pham
(74) *Attorney, Agent, or Firm* — Slater & Matsil, L.L.P.

(57) ABSTRACT

In accordance with an embodiment, a method of operating a touch panel includes operating a slave touch panel controller by receiving a synchronization signal from a master touch panel controller of a display driver circuit, and polling a plurality of receive inputs coupled to outputs of an in-cell touch module based on an predetermined pattern.

21 Claims, 5 Drawing Sheets

TOUCH PANEL HAVING A MASTER AND SLAVE CONTROLLER AND METHOD FOR DRIVING THEREOF

TECHNICAL FIELD

This invention relates generally to electronic circuits, and more particularly to a system and method for a touch panel.

BACKGROUND

Touch panel technology has advanced greatly over the past few years, from resistive touchscreen arrays capable of detecting a single touch coordinate, to capacitive touch panel systems capable of detecting multiple touch points on the touch panel, and decoding various swipes and gestures that may be used by application programs. For example, a right-handed swipe across the panel may be used by an application to change pages, while moving the tips of two fingers in opposite directions on the panel may be used by application to initiate a visual zoom of displayed media.

Touch panels have also advanced with respect to the form factor of the capacitive touch panel. For example, on-cell technology may be used to provide a thinner form factor by placing the capacitive touch panel on top of an LCD display panel with a small air gap between the capacitive sensor panel and the LCD display. More recently, in-cell technology has been developed in which the touch panel and the LCD display are integrated together, thereby making the display thinner, brighter, and less expensive compared to previous display technologies. As the physical dimensions of the touch panel and display shrink, however, the coupling between the LCD panel and the touch sensing signal becomes stronger, and switching noise generated by the LCD display may interfere with sensing functions of the touch panel. In some systems, sensing of the touch panel array may be performed during times in which signals driving the touch panel are not actively switching, such as during the horizontal or vertical display porch time.

SUMMARY OF THE INVENTION

In accordance with an embodiment, a method of operating a touch panel includes operating a slave touch panel controller by receiving a synchronization signal from a master touch panel controller of a display driver circuit, and polling a plurality of receive inputs coupled to outputs of an in-cell touch module based on a predetermined pattern.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of embodiments of the present invention and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

The present disclosure will be described with respect to embodiments in a specific context, namely a system and method for capacitive touch panel. Embodiments of this invention may also be applied to other circuits and systems, such as, video displays, sensor systems, proximity detection systems and other types of circuits and systems.

In an embodiment, an in-cell touch panel is interfaced to a master touch panel controller and a slave touch panel controller. The master touch panel controller may be disposed on a first integrated circuit along with the display driver electronics, and is configured to generate forcing signals for the in-cell touch panel, a synchronization signal for the a slave touch panel controller. The slave touch panel controller may reside on a second integrated circuit, and may receive the output of charge amplifiers disposed on the in-cell touch panel and determines the status of the touch panel based on the outputs of the charge amplifiers. In an embodiment, the slave touch panel controller polls the output of the charge amplifiers upon receipt of a synchronization system from the master touch panel controller on the first integrated circuit. Alternatively, the display driver electronics, the master touch panel controller, and the slave touch panel controller may be housed on a single integrated circuit.

Figure 1A:
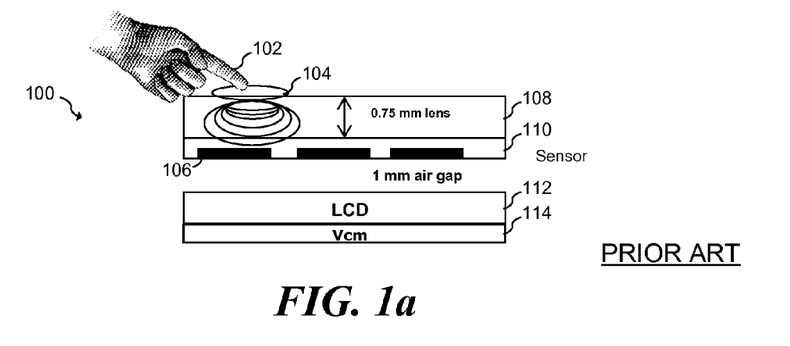
FIGS. 1a-f illustrate conventional touch panel systems and associated timing diagrams.

FIG. 1a illustrates conventional on-cell display and touch panel system 100 that has LCD display panel 112 disposed on interior layer 114 that is common to the entire display panel and may be biased to a common potential. Interior layer 114 may also be referred to as the VCOM layer. Suspended above LCD display panel 112 via a 1 mm air gap is touch panel 110 having electrodes 106, above which lens layer 108 is disposed. During operation, a voltage is applied to capacitive sensing electrodes 106 that creates electric field 104. When an object, such as finger 102, approaches touch panel system 100, the resulting change in electric field 104 affects a change in the capacitance seen by electrodes 106. By sensing this change in capacitance, the location of finger 102 with respect to a position on touch panel system 100 may be determined.

Figure 1B:
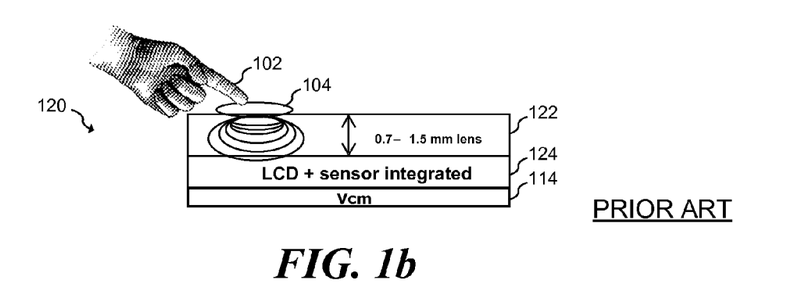

FIG. 1b illustrates conventional in-cell display and touch panel system 120. Here, an integrated LCD display and capacitive touch panel is integrated in LCD and sensor array 124 disposed over interior layer 114. Lens layer 122 is then disposed above LCD and sensor array 124. The detection of a touched area of the display operates according to the same principles as on-cell system 100 shown in FIG. 1a. However, the vertical dimension of in-cell system 120 is less than that of on-cell system 100. This reduction in vertical dimensions allows for a thinner and brighter display. Due to the closer proximity of the LCD display and capacitive sensor arrangement, the effect of switching noise generated by the LCD display on the capacitive sensor arrangement becomes more pronounced.

Figure 1C:
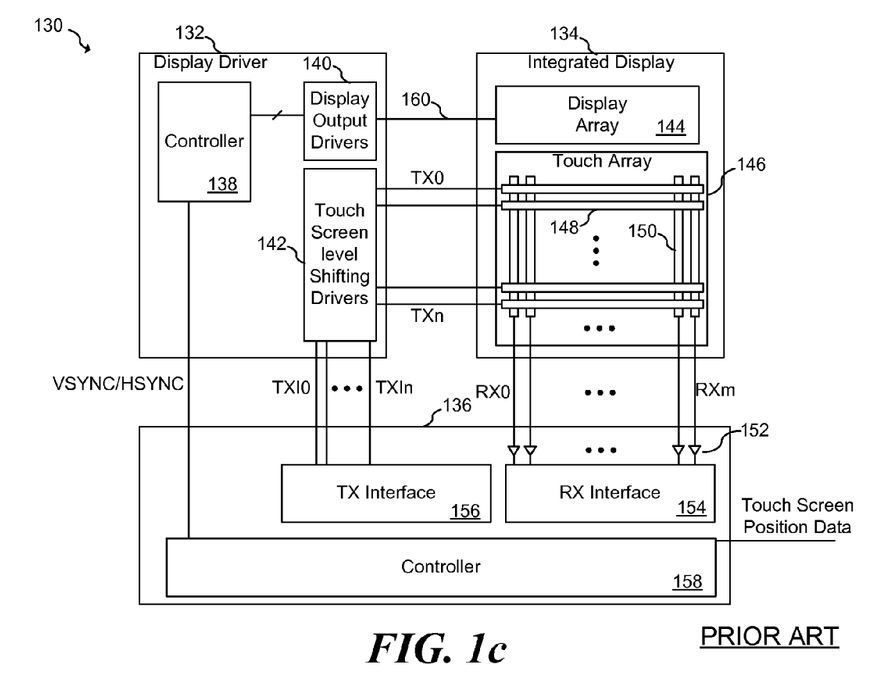

FIG. 1c illustrates conventional in-cell touch panel system 130 that contains integrated in-cell display and touchscreen 134 coupled to display driver 132 and touchscreen controller 136. Integrated display 134 has visual display array 144 that contains, for example, an LCD display. Interspersed within this display is touch array 146 having horizontal conductive rows 148 that overlay vertical conductive rows 150. At the intersection of each of the rows 148 and 150, a capacitor is formed. During operation of touch array 146, forcing signals TX0 to TXn are pulsed, thereby driving a voltage pulse on each of horizontal rows 148. This pulse is then capacitively coupled to vertical conductive rows 150, and the magnitude of each pulse is detected by charge amplifiers 152 on touch panel controller 136 via outputs RX0 to RXm. If an object, such as a finger, is in close proximity to an intersection of one of conductive rows 148 and conductive columns 150, the amplitude of the voltage pulse detected by a corresponding charge amplifier 152 will be reduced.

Touch panel controller 136 is coupled to outputs RX0 to RXm of touch array 146, such that the location of a touched portion of touch array 146 may be determined by monitoring the states of signals TX0 to TXn and RX0 to RXm. Touch panel controller 136 contains charge amplifiers 152 having inputs coupled to signals RX0 to RXm and outputs coupled to receive interface 154. Transmit interface 156 generates signals TXI0 to TXIn that are buffered by display driver 132. In some cases, signals TXIO to TXIn may be a two-line interface that includes a force selection line and a force line and a common driving signal to reduce the number of signals between touch panel controller 136 and display driver 132. Controller 158 controls transmit interface 156, gathers data from receive interface 154, and produces touchscreen position data based on the states of transmit interface 156 and signals RX0 to RXm VA receive interface 154. In order to enhance the accuracy of the position detection on touch array 146, controller 158 monitors vertical synchronization signal VSYNC and horizontal synchronization signal HSYNC produced by controller 138 within display driver 132, as is described below.

Display driver 132 generates display signals 160 via drivers 140 to drive visual display array 144 of integrated display 134. In addition, forcing signals TXI0 though TXIn emanating from touchscreen controller 136 are buffered by level shifting drivers 142 to form forcing signals TX0 to TXn. In some cases, signals TX0 to TXn have a voltage swing of about −7.5V to about +7.5V, which is typically greater than the supply range of touchscreen controller 136 voltage range of touch panel controller 136. By using a higher signal swing, the touch sensitivity of the system is improved.

Figure 1D:
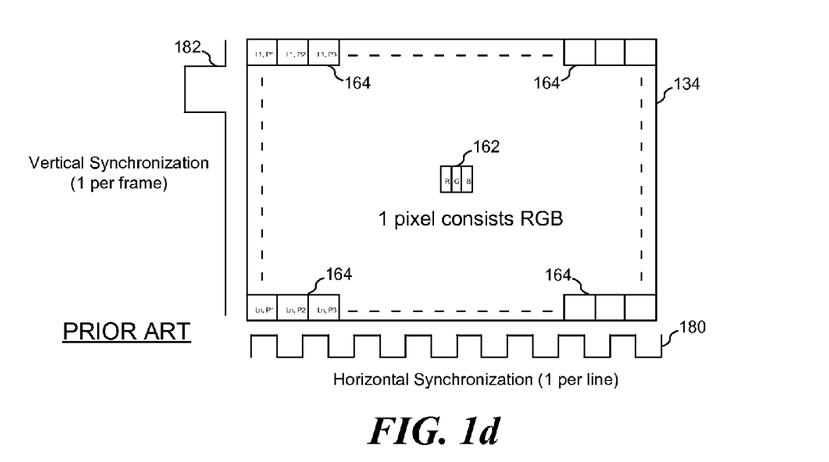

FIG. 1d illustrates a top view of integrated display 134 that contains pixel 162 and capacitive touch sensors 164. A single pixel 162 is shown as an example, however, it should be understood that display 134 may contain hundreds of thousands of pixels. Capacitive touch sensors 164 are integrated along with pixels 162 such that pixels 162 and sensors 164 cover the entire face of the display. During operation, horizontal synchronization station signal 180 goes low in between time periods in which pixel data is transmitted for each line, and vertical synchronization signal 182 goes low at the end of each frame.

Figure 1E:
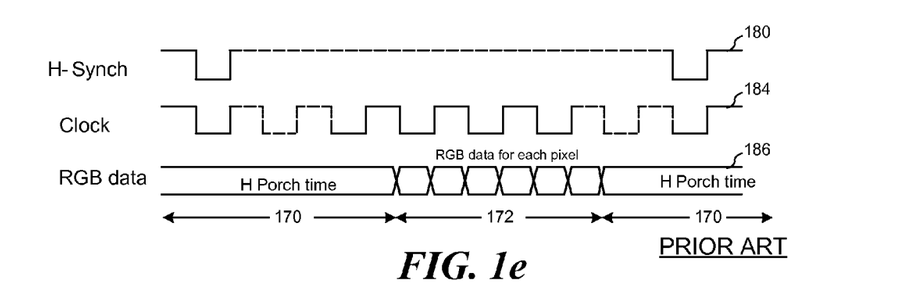

FIG. 1e illustrates a timing diagram showing the relationship between horizontal synchronization signal 180, clock signal 184, and RGB data 186. During time period 172, the display driver outputs data corresponding to pixel data. In between these times, for example, during time periods 170, when horizontal synchronization signal 180 is active, RGB data 186 is idle. This period of time is known as the horizontal porch time that may last between about 20 μs and about 30 μs. Horizontal porch time 170 may occur hundreds of times per frame as the display is refreshed row by row, as data is transferred to the display driver in preparation for the next row.

Figure 1F:
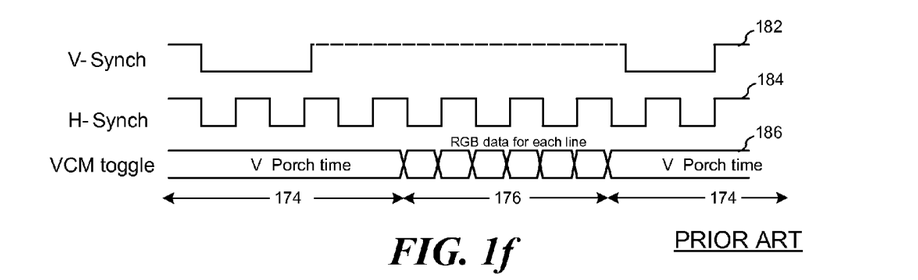

FIG. 1f illustrates a timing diagram showing the relationship between vertical synchronization signal 182, clock signal 184, and RGB data 186. Time period 176 represents the vertical porch time time during which data is fed to the display, and RGB data 186 is not transmitted. During the vertical porch time, the display driver or the video processor may compute data for the next frame. The vertical porch time occurs once per frame and may last longer than the horizontal porch time, for example, between about 5 ms and about 6 ms.

Because the LCD display 134 may be very noisy when the display is updated, touch screen operations are often scheduled to occur during the horizontal porch time and the vertical porch time. In some cases, sensors 164 may be scanned multiple times during a frame in order to average the results of sensor measurements to improve measurement and position sensing accuracy. As shown in FIG. 1c, touchscreen controller 136 uses the vertical synchronization signal and the horizontal synchronization signal in order to schedule touchscreen operations.

Figure 2:
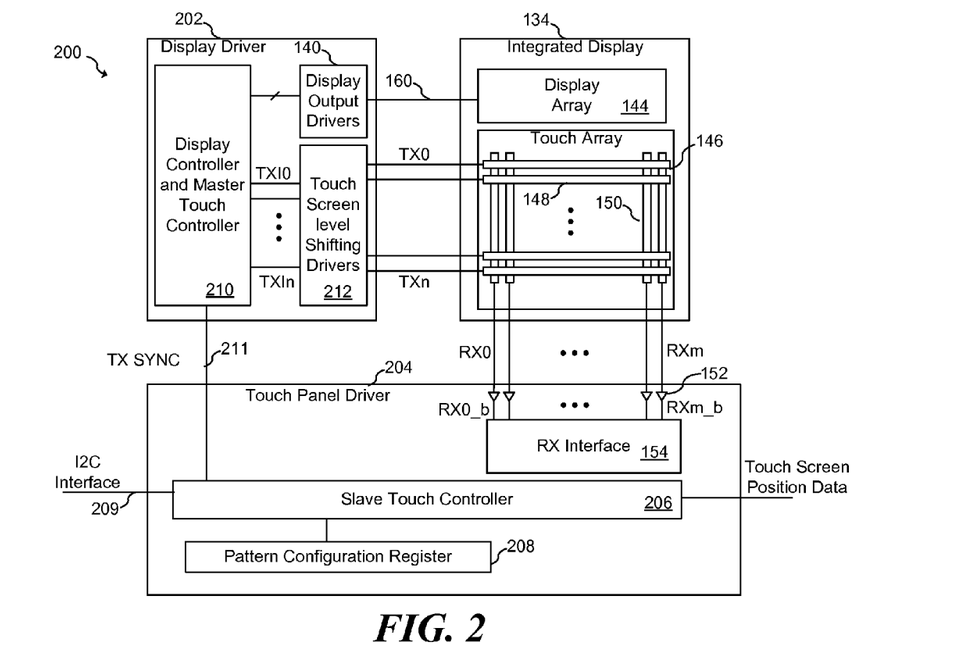
FIG. 2 illustrates an embodiment in-cell touchscreen and display system.

FIG. 2 illustrates in-cell touch panel and display system 200 having display driver 202, integrated in-cell touch panel display 134, and touch panel driver 204. In an embodiment, touch panel driver 204 has slave touch panel controller 206 and display driver and master touch panel controller master 210 contained in display driver 202. As shown in FIG. 2, touch panel driver 204 does not have force signal outputs TXI0 to TXIn as does system 130 shown in FIG. 1c. Rather, force signals TXI0 to TXIn are internally generated by display driver 202 and buffered by touchscreen level shifting drivers 212 within display driver 202. By partitioning the generation of force signals TXI0 to TXIn within display driver 202, the interface between display driver 202 and touch panel driver 204 may be simplified.

Display driver and touch panel master controller 210 functions as a master controller and generates synchronization signal TX SYNC 211 some time after the horizontal synchronization signal and/or the vertical synchronization signal is asserted. In some embodiments, this period of time may be between about few nanoseconds and about few tens of nanoseconds. When slave touch panel controller 206, (which functions as a slave controller to display driver and touch panel master controller 210) receives a pulse on TX SYNC 211, slave touch panel controller 206 polls touch array outputs RX0 to RXM via receive interface 154. This polling is performed according to a predetermined sequence and/or configuration that is prearranged between display driver 202 and touch panel driver 204.

In an embodiment, the predetermined sequence may be based, for example, upon the number of rows and columns in an integrated display 134, the number of force sense signals TX0 to TXn, the number of receive signals RX0 to RXm, the clock frequency, and other system parameters. In some embodiments, these parameters may be loaded into pattern configuration register 208 via I2C interface 209. Alternatively, I2C interface 209 may be implemented by another type of digital interface, such as a SPI bus or other type of serial interface. Alternatively a parallel digital interface may be used. Since touch panel driver 204 "knows" the expected timing of display driver 202, the reading of touch array signals RX0 to RXm can proceed as soon as TX SYNC signal 211 is received by slave touch panel controller 206. Because the timing is prearranged, very little time is lost to interface protocol latency between display driver 202 and touch panel driver 204. Furthermore, the interface between display driver 202 and touch panel driver 204 is simplified both with respect to the interface protocol and with respect to the number of signals coupled between display driver 202 and touch panel driver 204. Because of the reduced latency, the system may be arranged to scan touch array 146 more frequently.

Figure 3:
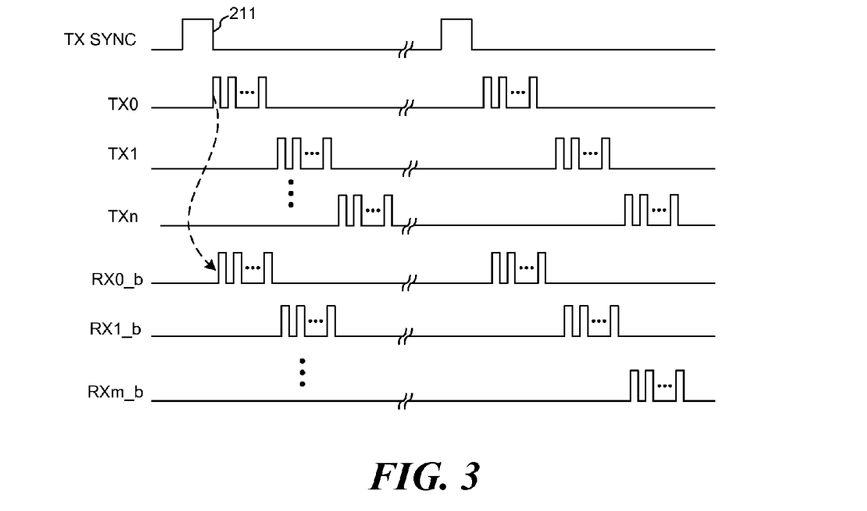
FIG. 3 illustrates timing diagram of an embodiment in-cell touchscreen and display system.

FIG. 3 illustrates an embodiment timing diagram for in-cell touchscreen and display system 200. In an embodiment, display driver and touch panel master controller 210 generates TX SYNC signal 211. Next, display driver 202 outputs sequential pulses on lines TX0 to TXn. In some embodiments, multiple pulses may be may be generated on each TX line before the next line is pulsed. For example, in some embodiments, 64, 128, or any number of pulses may be generated on each TX line before the next line is pulsed. The assertion of pulses on lines TX0 to TXn causes corresponding pulses to be detected by charge amplifiers 152. Slave touch panel controller 206 polls RX0 to RXm via charge amplifiers 152 and receive interface 154.

In some embodiments, the number of force signals TX0 to TXn and receive signals RX0 to RXm may vary according to the geometry of integrated display 134. For example, in a typical 4 inch touch screen, there may be between about 12 and 16 charge amplifiers 152, and about 20 horizontal rows 148 that act as force lines, such that n=19 and m=15. Therefore, touch array 146 receives force signals TX0 and TX19 and outputs receive signals RX0 to RX15. Alternatively, a different number of force lines and charge amplifiers may be used depending on the particular system and its specifications.

Figure 4:
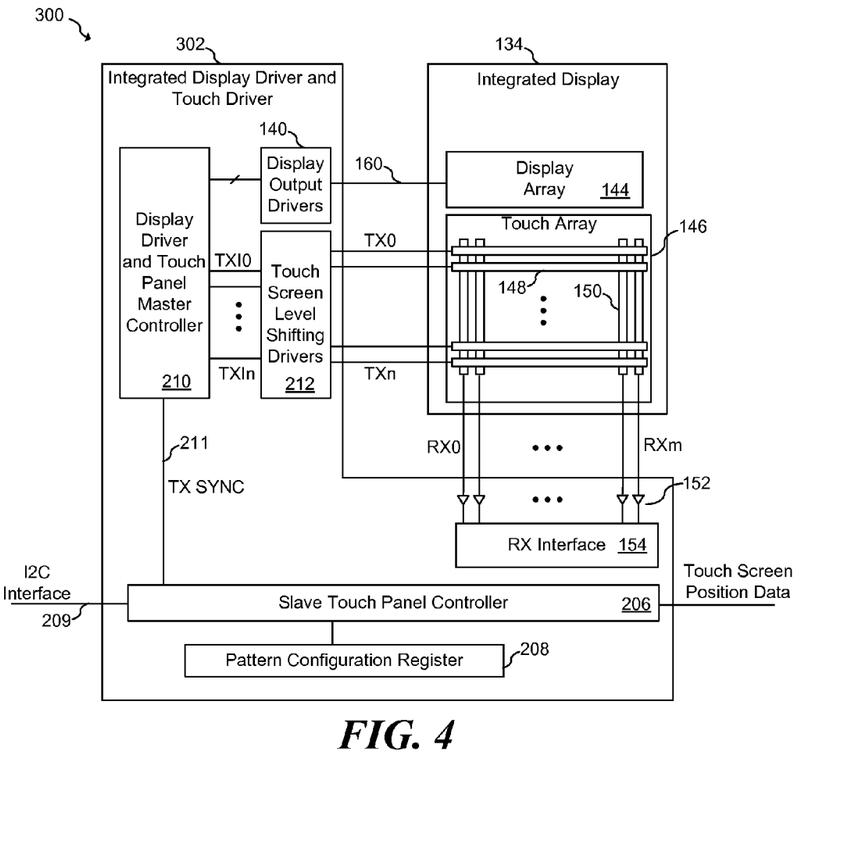
FIG. 4 illustrate an alternative embodiment in-cell touchscreen and display system.

FIG. 4 illustrates in-cell touch screen and display system 300 according to a further embodiment. Here, the functionality of the display driver and touch panel master controller 210, and slave touch controller 206 is implemented on single integrated circuit 302. It should be appreciated that functionality may be partitioned in other ways, for example, by separating touch screen level shifting drivers 212 from integrated circuit 302.

Figure 5A:
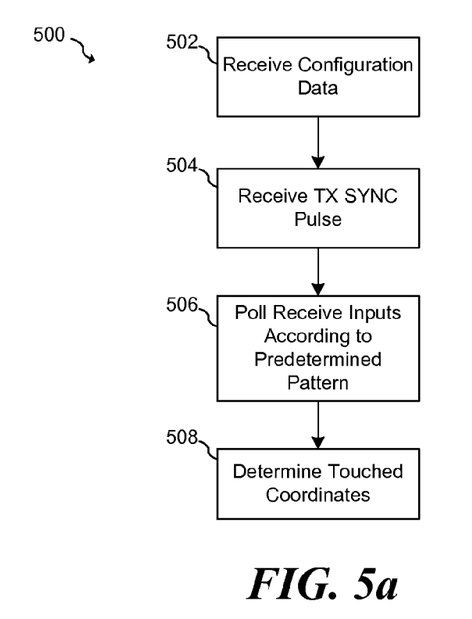
FIGS. 5a-b illustrate flowcharts of embodiment methods of operating touch panel controllers.

FIG. 5a illustrates method 500 of operating an embodiment slave touch panel controller. In step 502, the slave controller receives configuration data. This configuration data is indicative of the expected system timing, and may be configured in a number of ways. For example, in one embodiment, the configuration data may contain information such as the number of force lines in the touch panel, the resolution and dimensions of the display, and the like. Alternatively, this data may be coded in a more compact form. For example, the configuration data may contain a code or index value that indicates which of finite number of predetermined configurations may be used. In some embodiments, this data may be received via a serial interface, such as an I2C interface or other interface.

Next, in step 504, the slave controller receives a TX SYNC pulse from the master touch controller. After receiving the TX SYNC pulse, the output signals of the touch panel are polled in step 506. Based on the state of these polled signals, touched coordinates are detected in step 508 according to techniques known in the art. In some embodiments, these coordinates are transmitted to a processor or other system.

Figure 5B:
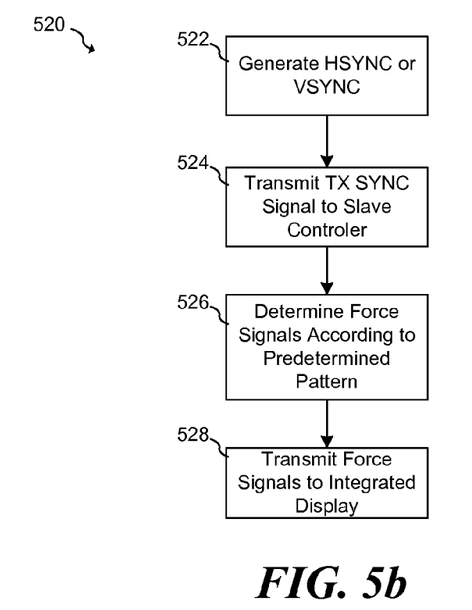

FIG. 5b illustrates method 520 of operating an embodiment master controller. In step 522, the horizontal or vertical synchronization signal is generated by the display driver. Next, in step 524, a TX SYNC signal is transmitted to the slave touch controller in order to initiate polling of the output of the integrated display. Force signals are then determined according to a predetermined pattern in step 526, and transmitted to the integrated display in step 528.

In accordance with an embodiment, a method of operating a touch panel includes operating a slave touch panel controller by receiving a synchronization signal from a master touch panel controller of a display driver circuit, and polling a plurality of receive inputs coupled to outputs of an in-cell touch module based on an predetermined pattern. The method may also include determining a selected coordinate of the in-cell touch module based on the polling and/or setting the predetermined pattern. In some embodiments, the predetermined pattern is set by receiving configuration information via a digital interface.

In some embodiments, the method further includes operating the master touch panel controller of the display driver circuit by transmitting the synchronization signal to the slave touch panel controller, generating a plurality of force signals, and transmitting the plurality of force signals to the in-cell touch module. Transmitting the synchronization signal may include transmitting the synchronization signal from a first integrated circuit comprising the master touch panel controller to a second integrated circuit comprising the slave touch panel controller. Alternatively, transmitting the synchronization signal may include transmitting the synchronization signal from a first circuit comprising the master touch panel controller on a first integrated circuit to a second circuit comprising the slave touch panel controller on the first integrated circuit.

In accordance with a further embodiment, an in-cell touch panel controller circuit includes a plurality of receiver inputs configured to be coupled to touch panel output signals of an in-cell touch panel circuit of an integrated in-cell touch panel display, and a slave touch panel controller. The slave touch panel controller may be coupled to the plurality of receiver inputs and to a synchronization input configured to be coupled to a master touch panel controller of a display driver circuit. In addition, the slave touch panel controller may be configured to poll the plurality of receive inputs according to a predetermined pattern upon receipt of a signal on the synchronization input.

In an embodiment, the circuit also includes a serial interface coupled to the slave touch panel controller that is configured to receive configuration data to set the predetermined pattern. The serial interface may be coupled to a pattern configuration register, such that contents of the pattern configuration register affects the predetermined pattern.

The controller may be further configured to provide touch panel position data based on the polled plurality of receive inputs. The plurality of receive inputs and the slave touch panel controller may be disposed on a first integrated circuit. In addition, in some cases, the master touch panel controller may be disposed on a second integrated circuit separate from the first integrated circuit. The circuit, itself, may further include the master touch panel controller, which may be disposed on the first integrated circuit.

In an embodiment, the master touch panel controller includes a plurality of forcing outputs configured to be coupled to forcing inputs of the in-cell integrated touch panel display, and the master touch panel controller is configured to generate the plurality of forcing outputs and the synchronization input. The circuit may also include a plurality of charge amplifiers coupled to the plurality of receive inputs.

In accordance with a further embodiment, an integrated in-cell display system includes an integrated in-cell display having a plurality of touch panel forcing inputs, a plurality of display inputs, and a plurality of touch panel sensor outputs. The system also includes a first integrated circuit and a second integrated circuit. The first integrated circuit has a display driver coupled to the plurality of display inputs and a master touch panel controller coupled to the plurality of touch panel forcing inputs. The display driver may be configured to generate forcing signals on the plurality of forcing inputs and generate a synchronization signal on a synchronization output. Furthermore, the second integrated circuit includes a slave touch panel controller having a synchronization input coupled to the synchronization output of the master touch panel controller, and a plurality of receive inputs coupled to the plurality of touch panel sensor outputs. In some embodiments, the first integrated circuit and the second integrated circuit are separate integrated circuits.

The slave touch panel controller may be configured to poll the plurality of receive inputs upon receipt of the synchronization signal from the master touch panel controller. This polling may proceed according to a predetermined pattern in some embodiments. The slave touch panel controller may further include a serial interface coupled to a pattern configuration register, such that the pattern configuration register is configured to determine the predetermined pattern.

Advantages of embodiments include the ability to detect the state of an in-cell touch panel system without having to route force sensing lines between the touch panel controller integrated circuit and the display driver integrated circuit. By reducing the number of lines on the board, the size of the integrated circuit packages of the touch panel controller and the display driver integrated circuit may be reduced. The size of the printed circuit board or other substrate or material which the touch panel electronics are disposed may be reduces as well.

Further advantages of embodiments systems include reduced latency time of the touch panel sensor system. Having reduced latency allows the touch panel to be polled more often during operation. More frequent polling allows for faster response to user input, and/or higher detection accuracy due to the ability to perform more averaging of touch sensor measurements during operation of the system.

It will also be readily understood by those skilled in the art that materials and methods may be varied while remaining within the scope of the present invention. It is also appreciated that the present invention provides many applicable inventive concepts other than the specific contexts used to illustrate embodiments. Accordingly, the appended claims are intended to include within their scope such processes, machines, manufacture, compositions of matter, means, methods, or steps.

What is claimed is:

1. A method of operating a touch panel, the method comprising:
   operating a slave touch panel controller, operating the slave touch panel controller comprising
   receiving a single synchronization pulse from a master touch panel controller of a display driver circuit, wherein the master touch panel controller is configured to generate and transmit a plurality of force signals according to a first predetermined pattern that defines an order in which the plurality of force signals are transmitted to an in-cell touch module, and the master touch panel controller is configured to generate the single synchronization pulse a first period of time after at least one of a horizontal synchronization signal and a vertical synchronization signal is asserted, and
   upon receipt of the single synchronization pulse, polling a plurality of receive inputs coupled to outputs of the in-cell touch module according to a second predetermined pattern, wherein the second predetermined pattern defines an order in which the plurality of receive inputs are polled, the second predetermined pattern corresponds to the first predetermined pattern, and the polling is initiated upon receipt of only the single synchronization pulse.

2. The method of claim 1, further comprising determining a selected coordinate of the in-cell touch module based on the polling.

3. The method of claim 1, further comprising setting the second predetermined pattern.

4. The method of claim 3, wherein setting the second predetermined pattern comprises receiving configuration information via a digital interface.

5. The method of claim 1, further comprising operating the master touch panel controller of the display driver circuit, operating the master touch panel controller comprising:
   transmitting the single synchronization pulse to the slave touch panel controller;
   generating the plurality of force signals; and
   transmitting the plurality of force signals to the in-cell touch module.

6. The method of claim 5, wherein transmitting the single synchronization pulse comprises transmitting the single synchronization pulse from a first integrated circuit comprising the master touch panel controller to a second integrated circuit comprising the slave touch panel controller.

7. The method of claim 5, wherein transmitting the single synchronization pulse comprises transmitting the single synchronization pulse from a first circuit comprising the master touch panel controller on a first integrated circuit to a second circuit comprising the slave touch panel controller on the first integrated circuit.

8. An in-cell touch panel controller circuit comprising:
   a plurality of receiver inputs configured to be coupled to touch panel output signals of an in-cell touch panel circuit of an integrated in-cell touch panel display; and
   a slave touch panel controller coupled to the plurality of receiver inputs and to a single synchronization input configured to be coupled to a master touch panel controller of a display driver circuit, wherein
   the master touch panel controller is configured to generate and transmit a single synchronization pulse and a plurality of force signals according to a first predetermined pattern that defines an order in which the plurality of force signals are transmitted to the integrated in-cell touch panel display, and the master touch panel controller is configured to generate the single synchronization pulse a first period of time after at least one of a horizontal synchronization signal and a vertical synchronization signal is asserted, and
   the slave touch panel controller is configured to poll the plurality of receive inputs according to a second predetermined pattern upon receipt of the single synchronization pulse on the single synchronization input, wherein the second predetermined pattern defines an order in which the plurality of receive inputs are polled, the second predetermined pattern corresponds to the first predetermined pattern, and the slave touch panel controller is configured to initiate polling the plurality of receive inputs upon receipt of only the single synchronization pulse.

9. The circuit of claim 8, further comprising a serial interface coupled to the slave touch panel controller, the serial interface configured to receive configuration data to set the second predetermined pattern.

10. The circuit of claim 9, wherein the slave touch panel controller further comprises a pattern configuration register coupled to the serial interface, wherein contents of the pattern configuration register affects the second predetermined pattern.

11. The circuit of claim 8, wherein the slave touch panel controller is further configured to provide touch panel position data based on the polled plurality of receive inputs.

12. The circuit of claim 8, wherein the plurality of receive inputs and the slave touch panel controller is disposed on a first integrated circuit.

13. The circuit of claim 12, wherein the master touch panel controller is disposed on a second integrated circuit separate from the first integrated circuit.

14. The circuit of claim 12, further comprising the master touch panel controller.

15. The circuit of claim 14, wherein the master touch panel controller is disposed on the first integrated circuit.

16. The circuit of claim 14, wherein the master touch panel controller comprises a plurality of forcing outputs configured to be coupled to forcing inputs of the integrated in-cell touch panel display.

17. The circuit of claim 14, further comprising a plurality of charge amplifiers coupled to the plurality of receive inputs.

18. An integrated in-cell display system comprising:
an integrated in-cell display comprising a plurality of touch panel forcing inputs, a plurality of display inputs, and a plurality of touch panel sensor outputs;
a first integrated circuit comprising a display driver coupled to the plurality of display inputs and a master touch panel controller coupled to the plurality of touch panel forcing inputs, the master touch panel controller configured to generate forcing signals on the plurality of touch panel forcing inputs according to a first predetermined pattern that defines an order in which forcing signals are transmitted via the plurality of touch panel forcing inputs to the integrated in-cell display and generate a single synchronization pulse on a single synchronization output, wherein the first integrated circuit is configured to generate the single synchronization pulse a first period of time after at least one of a horizontal synchronization signal and a vertical synchronization signal is asserted; and
a second integrated circuit comprising a slave touch panel controller having a single synchronization input coupled to the single synchronization output of the master touch panel controller, and a plurality of receive inputs coupled to the plurality of touch panel sensor outputs, wherein the slave touch panel controller is configured to poll the plurality of receive inputs according to a second predetermined pattern upon receipt of the single synchronization pulse from the master touch panel controller, wherein the second predetermined pattern defines an order in which the plurality of receive inputs are polled, the second predetermined pattern corresponds to the first predetermined pattern, and the slave touch panel controller is configured to initiate polling the plurality of receive inputs upon receipt of only the single synchronization pulse.

19. The system of claim 18, wherein the first integrated circuit and the second integrated circuit comprises separate integrated circuits.

20. The system of claim 18, wherein the slave touch panel controller further comprises a serial interface coupled to a pattern configuration register, the pattern configuration register configured to determine the second predetermined pattern.

21. The system of claim 18, wherein the first integrated circuit comprises a plurality of level shifting drivers having inputs coupled to the master touch panel controller and outputs coupled to the plurality of touch panel forcing inputs.

* * * * *